(12) United States Patent
Burrows

(10) Patent No.: US 9,674,895 B1
(45) Date of Patent: Jun. 6, 2017

(54) GLAZING PERIMETER ANTICONDENSATION COATING PRODUCTION TECHNOLOGY

(71) Applicant: Cardinal CG Company, Eden Prairie, MN (US)

(72) Inventor: Keith James Burrows, Mineral Point, WI (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

(21) Appl. No.: 14/969,438

(22) Filed: Dec. 15, 2015

(51) Int. Cl.
*C03C 17/23* (2006.01)
*E06B 7/12* (2006.01)
*H05B 3/00* (2006.01)
*C03B 27/012* (2006.01)

(52) U.S. Cl.
CPC ......... *H05B 3/0033* (2013.01); *C03B 27/012* (2013.01); *C03C 17/23* (2013.01); *E06B 7/12* (2013.01); *C03C 2217/228* (2013.01); *C03C 2217/70* (2013.01); *C03C 2218/322* (2013.01)

(58) Field of Classification Search
CPC .......... C03C 2217/228; C03C 2217/70; C03C 2218/322; E06B 7/12
See application file for complete search history.

(56) References Cited

U.S. PATENT DOCUMENTS

| | | |
|---|---|---|
| 2,971,867 A | 2/1961 | Lytle |
| 3,629,554 A | 12/1971 | Stewart |
| 4,166,018 A | 8/1979 | Chapin |
| 4,255,474 A | 3/1981 | Smith, Jr. |
| 4,385,226 A * | 5/1983 | Sauer ............ B32B 17/10 174/260 |
| 6,268,594 B1 | 7/2001 | Leutner et al. |
| 7,294,404 B2 | 11/2007 | Krisko et al. |
| 7,339,728 B2 | 3/2008 | Hartig |
| 7,342,716 B2 | 3/2008 | Hartig |
| 7,572,509 B2 | 8/2009 | Hartig |
| 7,572,510 B2 | 8/2009 | Hartig |
| 7,572,511 B2 | 8/2009 | Hartig |
| 7,604,865 B2 | 10/2009 | Krisko et al. |
| 7,713,632 B2 | 5/2010 | Krisko et al. |

(Continued)

FOREIGN PATENT DOCUMENTS

| | | |
|---|---|---|
| DE | 19844046 A1 | 3/2000 |
| GB | 2286008 A | 8/1995 |

OTHER PUBLICATIONS

U.S. Appl. No. 14/969,397, entitled "Glazing Perimeter Anticondensation Coating Technology," filed Dec. 15, 2015, 41 pages.

(Continued)

*Primary Examiner* — Erin Snelting
(74) *Attorney, Agent, or Firm* — Fredrikson & Byron, P.A.

(57) ABSTRACT

The invention provides a glass pane that has a transparent electrically conductive coating on a surface of the glass pane, such that the glass pane has a coated surface. The coated surface has a central region and a perimeter region. The transparent electrically conductive coating has a higher electrical conductivity at the central region than it does at the perimeter region. In some embodiments, the coated glass pane is part of an IG unit. Also provided are methods of producing a coated glass pane having an anti-condensation perimeter region.

22 Claims, 8 Drawing Sheets

(56) References Cited

U.S. PATENT DOCUMENTS

| | | | |
|---|---|---|---|
| 7,820,296 B2 | 10/2010 | Myli et al. |
| 7,820,309 B2 | 10/2010 | Myli et al. |
| 7,862,910 B2 | 1/2011 | Krisko et al. |
| 7,906,203 B2 | 3/2011 | Hartig |
| 7,923,114 B2 | 4/2011 | Myli et al. |
| 8,092,660 B2 | 1/2012 | Myli et al. |
| 8,293,344 B2 | 10/2012 | Lemmer et al. |
| 8,304,045 B2 | 11/2012 | Lemmer et al. |
| 8,445,083 B2 | 5/2013 | Lemmer et al. |
| 8,524,337 B2 | 9/2013 | Lemmer et al. |
| 8,658,262 B2 | 2/2014 | Myli et al. |
| 8,790,757 B2 | 7/2014 | Lemmer et al. |
| 8,815,059 B2 | 8/2014 | McLean et al. |
| 8,834,976 B2 | 9/2014 | Lemmer et al. |
| 8,871,349 B2 | 10/2014 | Lemmer et al. |
| 8,980,386 B2 | 3/2015 | Lemmer et al. |
| 9,011,649 B2 | 4/2015 | Kharchenko et al. |
| 9,090,500 B2 | 7/2015 | Lemmer et al. |
| 2006/0118408 A1 | 6/2006 | Myli et al. |
| 2006/0121315 A1 | 6/2006 | Myli et al. |
| 2007/0009745 A1 | 1/2007 | Hoffman |
| 2007/0029186 A1 | 2/2007 | Krasnov et al. |
| 2007/0042114 A1 | 2/2007 | Krisko et al. |
| 2007/0082124 A1 | 4/2007 | Hartig |
| 2008/0223061 A1* | 9/2008 | Hixson .............. A47F 3/0426 62/248 |
| 2009/0214880 A1 | 8/2009 | Lemmer |
| 2009/0297886 A1 | 12/2009 | Gessert et al. |
| 2011/0013273 A1 | 1/2011 | Wilson et al. |
| 2011/0017725 A1 | 1/2011 | Figurelli et al. |
| 2011/0212311 A1 | 9/2011 | Lemmer et al. |
| 2012/0026573 A1 | 2/2012 | Collins et al. |
| 2012/0048722 A1 | 3/2012 | McLean et al. |
| 2012/0094075 A1 | 4/2012 | Peter et al. |
| 2012/0247063 A1 | 10/2012 | Grzybowski et al. |
| 2013/0095292 A1 | 4/2013 | Pfaff et al. |
| 2013/0129945 A1 | 5/2013 | Durandeau et al. |
| 2013/0318892 A1 | 12/2013 | Grommesh et al. |
| 2014/0237917 A1 | 8/2014 | Theios et al. |
| 2014/0314972 A1 | 10/2014 | Myli et al. |
| 2014/0334805 A1 | 11/2014 | McLean et al. |
| 2015/0017355 A1 | 1/2015 | Lemmer et al. |
| 2015/0159021 A1 | 6/2015 | Lemmer et al. |
| 2015/0239774 A1 | 8/2015 | Lamine et al. |
| 2015/0338713 A1 | 11/2015 | Brown |
| 2016/0060163 A1 | 3/2016 | Burrows et al. |
| 2016/0060948 A1 | 3/2016 | Burrows et al. |
| 2016/0060949 A1* | 3/2016 | Burrows .............. C03C 17/3411 428/34 |
| 2016/0107928 A1 | 4/2016 | Bayne et al. |
| 2016/0229741 A1* | 8/2016 | Canova .............. C03C 17/3423 |

OTHER PUBLICATIONS

PCT International Search Report and Written Opinion dated Feb. 20, 2017 for related Intl. App. No. PCT/US2016/064696, 10 pgs.

Office Action dated Jan. 26, 2017 for U.S. Appl. No. 14/969,397, 23 pgs.

* cited by examiner

GLAZING PERIMETER ANTICONDENSATION COATING PRODUCTION TECHNOLOGY

FIELD OF THE INVENTION

The present invention relates generally to thin film coatings for glass and other substrates. More particularly, this invention relates to heat-treated transparent electrically conductive coatings.

BACKGROUND OF THE INVENTION

Water sometimes collects on windows and other glazing assemblies, like any other surfaces, in the form of condensation. Condensation forms, for example, when a window surface is cooled to the point where the rate of evaporation from the surface is lower than the rate of condensation to the surface from the air. A cooler surface or a higher moisture content in the air will make condensation more likely. Consider a winter environment where the outdoor conditions are relatively cold and the indoor environment is relatively warm, and at least somewhat humid. When condensation forms on a glazing in such environments, it is typically more likely to occur at the perimeter of the room-side glass surface, i.e., near the frame. This is because the edge region of a multiple-pane insulating glass unit ("IG unit") typically is less thermally insulative than its center region. As will be appreciated, the center region of an IG unit has at least one thermally insulative between-pane space separating two glass panes. This space may contain air, a mix of air and thermally insulative gas (e.g., argon), or a vacuum. As a result, heat transfer through the center region of an IG unit is particularly low. While heat transfer at the edge region of an IG unit may also be low, it is typically somewhat higher than at the central region due to the presence of a spacer and sealant connecting the panes. The spacer and sealant, while engineered to reduce heat transfer, provide a thermal conduction pathway that is not present at the center region of an IG unit.

Thus, in winter environments, the perimeter of the room-side glass surface of an IG unit will typically be cooler than the center and is more likely to form condensation than is the center region. While particular winter conditions have been mentioned, it will be appreciated that the perimeter regions of a glazing can form condensation in various seasons, climates, environments, and glazing arrangements. Thus, it would be desirable to provide a coating system that reduces the potential for glazing perimeter condensation to occur.

SUMMARY OF THE INVENTION

Figure 1:
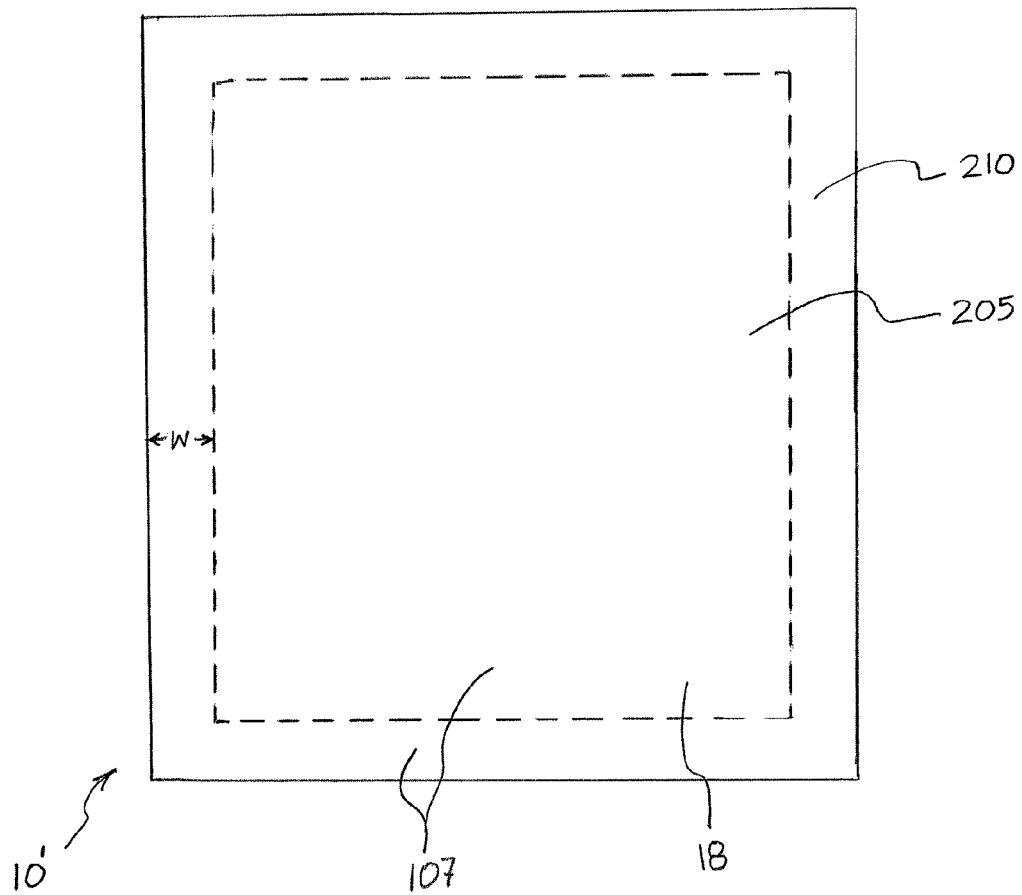
FIG. 1 is a schematic front view of a coated glass pane in accordance with certain embodiments of the present invention.

In some embodiments, the invention provides a glass pane having a transparent electrically conductive coating on a surface of the glass pane, such that the glass pane has a coated surface. The coated surface has a central region and a perimeter region. The transparent electrically conductive coating has a higher electrical conductivity at the central region than it does at the perimeter region.

Certain embodiments of the invention provide a multiple-pane insulating glass unit that includes at least two glass panes and has at least one between-pane space. The multiple pane insulating glass unit has two external surfaces and a plurality of internal surfaces. Each of the internal surfaces is exposed to a between-pane space of the multiple-pane insulating glass unit. Each of the two external surfaces is exposed to an environment external to the multiple-pane insulating glass unit. A desired one of the two external surfaces has a transparent electrically conductive coating, so as to define a coated surface. The coated surface has a central region and a perimeter region. The transparent electrically conductive coating has a higher electrical conductivity at the central region than it does at the perimeter region.

Some embodiments of the invention provide a glazing that includes a frame and a multiple-pane insulating glass unit. The multiple-pane insulating glass unit is mounted to the frame. The multiple-pane insulating glass unit includes an inboard glass pane and an outboard glass pane and has at least one between-pane space. The outboard glass pane defines an external surface that is exposed to periodic contact with rain. The inboard glass pane defines an external surface that is exposed to a room-side environment inside a building. The external surface of the inboard glass pane has a transparent electrically conductive coating, so as to define a coated surface. The coated surface has a central region and a perimeter region. The transparent electrically conductive coating has a higher electrical conductivity at the central region than it does at the perimeter region.

In certain embodiments, the invention provides a heat treatment method. The method involves providing a glass pane having a transparent electrically conductive coating on a surface of the glass pane, such that the glass pane has a coated surface. The coated surface has a central region and a perimeter region. The method includes selectively heat treating either the central region or the perimeter region of the coated surface such that the transparent electrically conductive coating has a higher electrical conductivity at the central region than it does at the perimeter region.

In some embodiments, the invention provides a glass pane having a transparent electrically conductive coating on a surface of the glass pane, such that the glass pane has a coated surface. In the present embodiments, the glass pane is tempered glass having a surface stress of greater than 10,000 psi. The coated surface has a central region and a perimeter region. The transparent electrically conductive coating has a higher electrical conductivity at the central region than it does at the perimeter region. Preferably, the transparent electrically conductive coating includes a transparent electrically conductive oxide film that is oxidized to a different extent at the central region than it is at the perimeter region. In preferred embodiments, the transparent electrically conductive coating has a sheet resistance that is at least 5 Ω/square higher at the perimeter region than it is at the central region. Preferably, the transparent electrically conductive coating has a visible transmission that is substantially the same at the perimeter region as it is at the central region. For example, the visible transmission at the perimeter region may be no more than 2% different from the visible transmission at the central region. In preferred embodiments, the transparent electrically conductive coating has a thickness of less than 3,000 Å, and at the central region, the transparent electrically conductive coating has a sheet resistance of less than 30 Ω/square in combination with the coated glass pane having a monolithic visible transmittance of greater than 0.82.

Some embodiments of the invention provide a heat treatment method. The method includes providing a glass pane having a transparent electrically conductive coating on a surface of the glass pane, such that the glass pane has a coated surface. The coated surface has a central region and a perimeter region. In the present embodiments, the method involves performing first and second heat treatments. The first heat treatment involves tempering the coated glass pane. The second heat treatment involves selectively heat treating either the central region or the perimeter region of the coated surface, such that the transparent electrically conductive coating has a higher electrical conductivity at the central region than it does at the perimeter region.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The invention provides a coated glass pane having an anti-condensation perimeter region. The glass pane 10' has a transparent electrically conductive coating 107 on a surface 18 of the glass pane, such that the glass pane has a coated surface. The term "transparent" here means the coating has a visible transmission of at least 20%. The coated surface 18 has a central region 205 and a perimeter region 210. The coating 107 has higher electrical conductivity at the central region 205 than it does at the perimeter region 210.

Preferably, the electrical conductivity of the coating 107 as averaged over the entire central region 205 is higher than the electrical conductivity of the coating 107 as averaged over the entire perimeter region 210. In some cases, the electrical conductivity of the coating 107 is higher at all areas of the central region 205 than it is at all areas of the perimeter region 210.

By providing the perimeter region 210 with lower conductivity than the central region 205, condensation will be less likely to occur at the perimeter region under certain conditions. Consider the performance of the IG unit 110 of FIG. 3 in winter conditions like those discussed above. The perimeter region 210 of the room-side surface 18 is adjacent to the spacer and sealant at the edge of the IG unit. As a result, the perimeter region will lose more heat due to the adjacent outward flow of heat by conduction through the panes, spacer, and sealant. The present invention seeks to compensate for this phenomenon by providing the perimeter region 210 with lower conductivity than the central region 205. For transparent electrically conductive coatings, lower conductivity (i.e., higher resistivity) correlates with higher emissivity. Higher emissivity means the surface will more easily absorb (as opposed to reflect) radiation. This causes the coating 107 at the perimeter region 210 to be less effective as a heat shield. The perimeter region 210 of the coated surface 18 is therefore warmed by radiative heat transfer from the interior environment. This keeps the perimeter region 210 warmer than it would be otherwise, thereby reducing the likelihood of condensation forming on the perimeter region The desired arrangement of different electrical conductivity levels can be created by a process that includes selectively heat treating the central region 205 or the perimeter region 210. For example, the central region 205 of the coated surface 18 can be heat treated by a different process than is the perimeter region. Alternatively, heat treatment can be performed only on the central region. More will be said of this later.

FIG. 1 shows a glass pane 10' having a surface 18 coated with a transparent electrically conductive ("TC") coating 107. The TC coating 107 can be any transparent electrically conductive coating. Insofar as the glass pane 10' is concerned, a variety of well-known glass types can be used, such as soda-lime glass. In some cases, it may be desirable to use "white glass," a low iron glass, etc. In some embodiments, the glass pane is part of a window, door, skylight, or other glazing. For certain applications, it may be desirable that the glass pane be tinted glass.

Glass panes of various sizes can be used in the present invention. Commonly, large-area glass panes are used. Certain embodiments involve a glass pane having a major dimension (e.g., a length or width) of at least 0.075 meter (e.g., between 0.075 meter and 4 meters), such as at least 0.1 meter, or in some cases at least 0.5 meter, at least 1 meter, or at least 1.5 meters (e.g., between 2 and 4 meters). The smaller pane sizes may be used, for example, in a true divided lite glazing.

Glass panes of various thicknesses can be used in the present invention. In some embodiments, the glass pane has a thickness of 1-14 mm, such as 2-14 mm. Certain embodiments involve a substrate with a thickness of between about 2.3 mm and about 4.8 mm, and perhaps more preferably between about 2.5 mm and about 4.8 mm. In one particular embodiment, a sheet of soda-lime glass with a thickness of about 3 mm is used.

The glass pane 10' has opposed surfaces (16 and 18), which preferably are major surfaces (as opposed to edge surfaces). In some cases, surface 16 is destined to be an internal surface exposed to a between-pane space of a multiple-pane insulating glazing unit ("IG unit"), while surface 18 is destined to be an external surface exposed to an interior of a building. This, however, is not the case in all embodiments.

Preferably, the TC coating 107 includes a transparent conductive oxide film 20. For example, the TC coating 107 can optionally be an indium tin oxide based coating. Thus, in some cases, the TC coating 107 includes a transparent conductive oxide film comprising indium tin oxide. In such cases, the indium tin oxide film comprises indium tin oxide, optionally together with one or more other materials. If desired, zinc, aluminum, antimony, fluorine, carbon nanotubes, or other components can be included in the film. When provided, the indium tin oxide film preferably consists essentially of (e.g., contains more than 95% by weight), or consists of, indium tin oxide. A suitable indium tin oxide film can contain various relative percentages of indium and tin. On a metal-only basis, indium preferably is the major constituent. That is, indium preferably accounts for more than 50% of the film's total metal weight. The composition of such a film, on a metal-only basis, can optionally range from about 75% indium/25% tin to about 95% indium/5% tin, such as about 90% indium/10% tin.

The TC coating 107 can alternatively include a transparent conductive oxide film comprising fluorinated tin oxide ("FTO"), doped zinc oxide, such as aluminum-doped zinc oxide ("AZO"), doped titanium dioxide, such as niobium-doped $TiO_2$ ("NTO"), or any other transparent conductive oxide material.

In some cases, the TC coating 107 comprises a transparent conductive oxide film 20 having a thickness of less than 3,000 Å, less than 2,000 Å, less than 1,800 Å, or even less than 1,500 Å, such as from 1,050 Å to 1,450 Å. The TC coating 107 of any embodiment of the present disclosure can optionally include a TCO film 20 having a thickness in any one or more of these ranges. All thicknesses reported herein are physical thicknesses, unless otherwise specified.

In preferred embodiments, the TC coating 107 includes a transparent electrically conductive oxide ("TCO") film 20 that is oxidized to a different extent at the perimeter region 210 than it is at the central region 205. Preferably, the extent to which the TCO film 20 is oxidized as averaged over the entire central region 205 is different than the extent to which the TCO film is oxidized as averaged over the entire perimeter region 210. In some cases, the TCO film 20 is oxidized to a different extent (i.e., to a greater extent, or to a lesser extent) at all areas of the perimeter region 210 than it is at all areas of the central region 205.

The transparent conductive oxide film 20 can optionally be under oxidized at the perimeter region 210, such that the film at the perimeter region has a lower electrical conductivity than at the central region 205. Alternatively, the transparent conductive oxide film 20 can be over oxidized at the perimeter region 210, such the film at the perimeter region has a lower electrical conductivity than at the central region 205. In some embodiments, the TC coating 107 includes an indium tin oxide film that is oxidized to a different extent at the perimeter region than it is at the central region.

The TC coating 107 has a sheet resistance that is higher at the perimeter region 210 than it is at the central region 205. Preferably, the sheet resistance is at least 5 Ω/square higher at the perimeter region 210 than it is at the central region 205. In some cases, the sheet resistance is at least 7.5 Ω/square, or at least 10 Ω/square, higher at the perimeter region 210 than it is at the central region 205. Sheet resistance can be measured in standard fashion using a non-contact sheet resistance meter.

Preferably, the sheet resistance of the coating 107 as averaged over the entire perimeter region 210 is higher than the sheet resistance of the coating 107 as averaged over the entire central region 205. In such cases, the average sheet resistance at the perimeter region 210 may be higher than the average sheet resistance at the central region 205 by one or more of the differentials noted in the previous paragraph. In certain embodiments, the sheet resistance of the coating 107 is higher at all areas of the perimeter region 210 than it is at all areas of the central region 205.

The visible transmission of the coating 107 is substantially the same (i.e., having a difference in $T_{vis}$ of less than 10%) at the perimeter region 210 as it is at the central region 205. Preferably, the visible transmission at the perimeter region 210 is different from the visible transmission at the central region 205 by no more than 5%, no more than 3%, or no more than 2%, or no more than 1%.

The term "visible transmission" is well known in the art and is used herein in accordance with its well-known meaning to refer to the percentage of all incident visible radiation that is transmitted through a pane or IG unit. Visible radiation constitutes the wavelength range of between about 380 nm and about 780 nm. Visible transmittance, as well as visible reflectance, can be determined in accordance with NFRC 300-2014, Standard Test Method for Determining the Solar and Infrared Optical Properties of Glazing Materials and Fading Resistance of Systems. The well-known WINDOW 7.1 computer program can be used in calculating these and other reported optical properties.

The thickness of the coating 107 is at least substantially the same (i.e., with any difference being less than 10%) at the perimeter region 210 as it is at the central region 205. The thickness of the coating 107 at the perimeter region 210 preferably is different from the thickness at the central region 205 by no more than 5%, no more than 3%, or no more than 2%. It may well be the case that there is no measurable thickness difference between these two regions.

As noted above, the desired arrangement of different electrical conductivity levels can be created by a production process that includes selectively heat treating the central region 205 or the perimeter region 210. The overall production process employs one or more heat treatment techniques. Preferably, the production process includes at least one selective heat treatment technique performed such that the rear surface 16 of the glass pane 10' is maintained at a temperature of 150 degrees C. or less during the selective heat treatment. This temperature can be measured, for example, using pyrometry.

To limit heating of the glass during the selective heat treatment, the selective heat treatment technique preferably provides an irradiance at the TC coating 107 of 15 kW/cm² or greater, e.g., in the range of 15-45 kW/cm², or even 20 kW/cm² or greater, e.g., in the range of 20-45 kW/cm². In some cases, the irradiance is greater than 30 kW/cm², e.g., in the range of 30-45 kW/cm². By using such high energy density, the heat desired for converting the TC coating 107 is delivered rapidly (e.g., in less than 1 second, less than ½ second, or less than 50 milliseconds). This beneficially limits the heating of the glass.

In certain embodiments of this nature, since the glass pane 10' is maintained at a relatively low temperature during the selective heat treatment, the pane 10' is annealed glass prior to and after the selective heat treatment. For example, in some cases, the glass pane 10' is annealed glass having a surface stress, prior to and after the selective heat treatment, of less than 3,500 psi, less than 3,000 psi, or less than 2,500 psi. Surface stress can be determined using a grazing angle surface polarimeter as specified in ASTM C1048 and ASTM C1279, the teachings of which are incorporated herein by reference.

Figure 2:
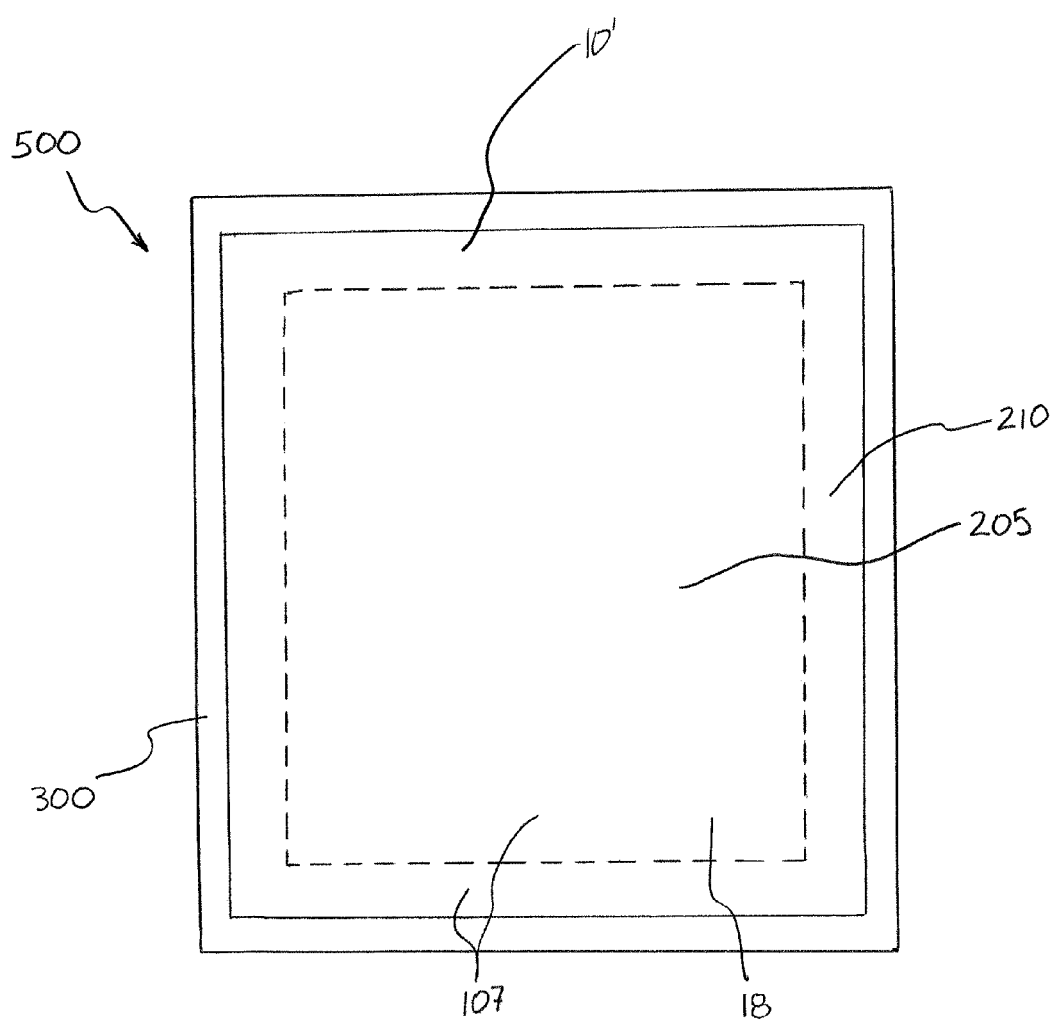
FIG. 2 is a schematic front view of the coated glass pane of FIG. 1 mounted to a frame in accordance with certain embodiments of the invention.

In FIGS. 1 and 2, the perimeter region 210 of the coated surface 18 surrounds the central region 205. Both of these regions 205, 210 are coated (in some cases, the entirety of both regions are coated) with the transparent electrically conductive coating 107, yet the coating at the central region is more electrically conductive than the coating at the perimeter region. Preferably, the perimeter region 210 entirely surrounds (i.e., surrounds on all sides) the central region 205. The width W of the perimeter region 210 can be varied. Generally, it will be less than 8 inches and greater than ⅛ inch. In preferred embodiments, the width W is 6 inches or less, while being greater than ¼ inch, such as greater than ½ inch but less than 4 inches, or greater than ½ inch but less than 3 inches. In FIGS. 1 and 2, the width W of the perimeter region 210 is the same all the way around the perimeter of the coated surface 18. This, however, is not required. For example, the width W of the perimeter region 210 may be greater on the top and bottom sides (as seen in FIG. 1) than it is on the left and right sides. In many embodiments, however, the width W of the perimeter region 210 will be at least substantially the same (i.e., varying by no more than 10%) all way around the perimeter of the coated surface 18.

The perimeter region 210 preferably constitutes less than 50% of the entire surface area of the coated surface 18. While the size and dimensions of the coated surface 18 and its perimeter region 210 will be varied to accommodate different glazing situations, it may be preferred that the perimeter region 210 constitute less than 45%, or even less than 40% of the area of the coated surface 18. A preferred range may be from 0.05 to 0.4, such as from 0.1 to 0.4, or from 0.2 to 0.4. As just one non-limiting example, when the pane surface 18 has dimensions of 36 inches by 44 inches, and when the width W of the perimeter region 210 is four inches, the ratio in question is 0.36.

Figure 3:
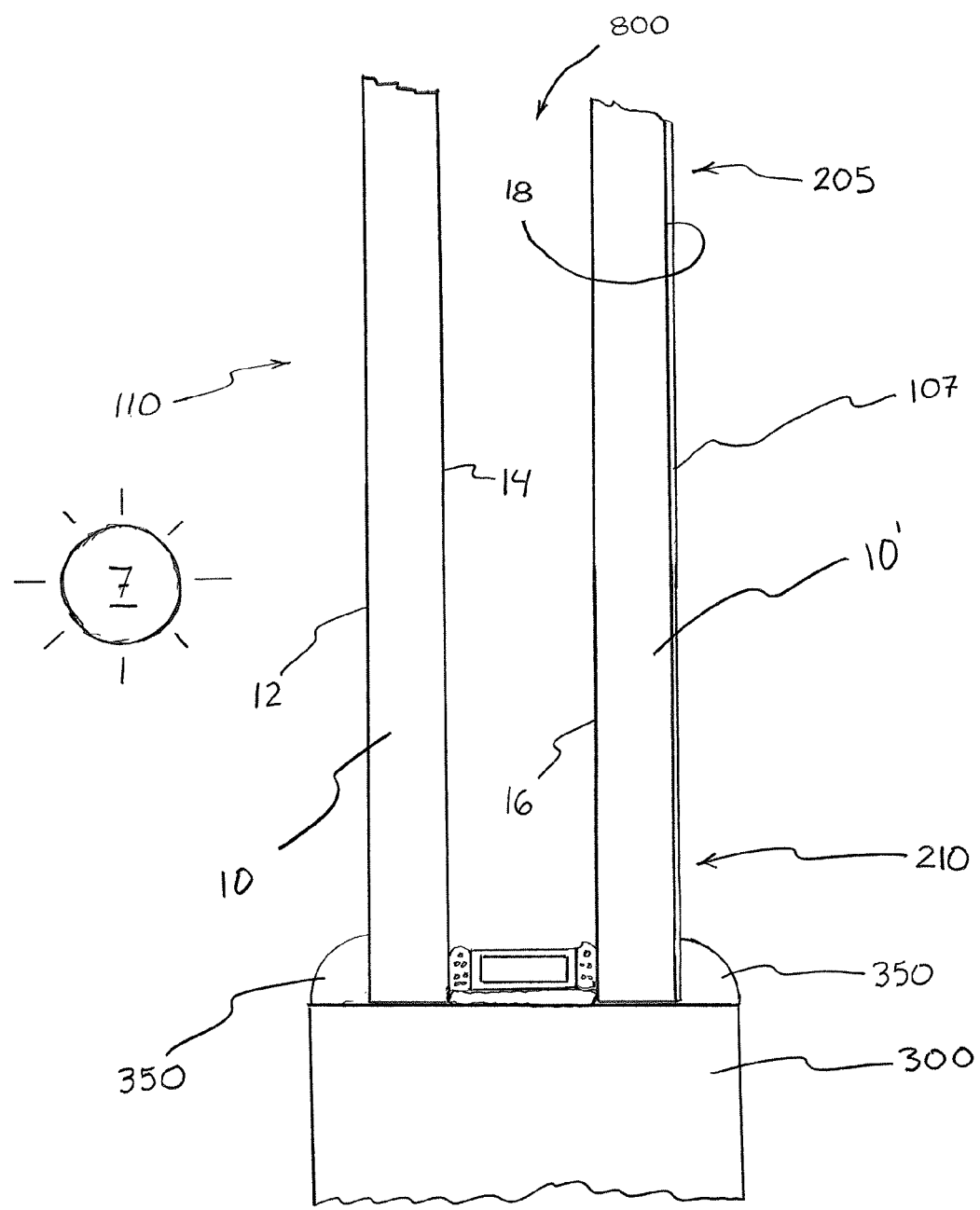
FIG. 3 is a schematic, broken-away, cross-sectional side view of a multiple-pane insulating glass unit mounted to a frame in accordance with certain embodiments of the invention.

In some cases, unlike the embodiment shown in FIG. 1, the perimeter region 210 having the higher sheet resistance does not extend all the way to the edge of the glass pane 10'. Since the outermost edge region of the glass pane 10' will typically be enclosed by a shoulder 350 of a frame 300 (as shown in FIG. 3), the higher sheet resistance perimeter region 210 may actually be spaced inwardly from the edge of the glass pane. Thus, when the perimeter region 210 is heat treated selectively, this can optionally involve controlling the selective heat treatment so it does not treat the very outermost edge region of the coated surface 18, but rather only flash treats a perimeter region that is spaced inwardly of the edge of the coated surface. Accordingly, while the perimeter region of the coated surface will in some embodiments be adjacent to the frame and surrounding the central region of the coated surface, the perimeter region may actually be located inwardly of the frame (i.e., closer to the central region of the coated surface).

The transparent electrically conductive coating 107 will typically extend all the way to the edge of the glass pane 10', as shown in FIGS. 1 and 3. If desired, however, edge deletion can be performed so as to remove an area of the coating 107 that is destined to be enclosed by a shoulder 350 of a frame 300. In such cases, the perimeter region 210 (which bears the TC coating 107) will be located inwardly of the edge deleted area, and the central region 205 will be located inwardly of the perimeter region 210.

In FIGS. 1 and 2, the dashed line schematically depicts a discrete interface between the perimeter region 210 and the central region 205. Depending on the technique used for the selective heat treatment, however, there may not be a discrete transition line between these two regions. For example, some embodiments provide a gradual transition between the higher conductivity central region 205 and the lower conductivity perimeter region 210. This may be the case, for example, when a flash bulb device is moved about the perimeter of the coated surface 18 so as to selectively flash treat the perimeter region 210. In such cases, the radiation from the flash bulb device may reach the coating 107 at a level that decreases gradually with increasing distance from the flash bulb device. Thus, in moving inwardly from the perimeter region 210 to the central region 205, there may be a gradient in terms of the film's oxidation level and electrical conductivity. In other cases (when a mask is used, when certain laser treatments are used, etc.), the transition between these two regions will be more discrete.

In some embodiments, the glass pane 10' is tempered glass. The tempered glass preferably has a surface stress of greater than 10,000 psi, such as greater than 10,000 psi and less than 15,000 psi, or perhaps optimally between 12,000 psi and 15,000 psi. As noted above, the glass pane 10' has a transparent electrically conductive coating 107 on a surface 18 of the glass pane, such that the glass pane has a coated surface. In the present embodiments, the coating 107 is subjected to the tempering temperatures together with the glass pane 10'. The coated surface 18 has a central region 205 and a perimeter region 210. The transparent electrically conductive coating 107 has a higher electrical conductivity at the central region 205 than it does at the perimeter region 210. As noted above, the transparent electrically conductive coating 107 preferably includes a transparent electrically conductive oxide film 20 (which may comprise, consist essentially, or consist of ITO) that is oxidized to a different extent at the central region 205 than it is at the perimeter region 210. In preferred embodiments, the transparent electrically conductive coating 107 has a sheet resistance that is at least 5 Ω/square higher at the perimeter region 210 than it is at the central region 205. Any of the sheet resistance differentials described above can be provided in the present tempered coated glass embodiments. Further, as detailed above, the transparent electrically conductive coating 107 has a visible transmission that is substantially the same at the perimeter region 210 as it is at the central region 205. The visible transmission at the perimeter region 210 may be, for example, no more than 5% (or no more than 3%, or no more than 2%, or no more than 1%) different from the visible transmission at the central region 205. In preferred embodiments, the transparent electrically conductive coating 107 has a thickness of less than 3,000 Å, and at the central region 205, the transparent electrically conductive coating has a sheet resistance of less than 30 Ω/square in combination with the coated glass pane 10' having a monolithic visible transmittance of greater than 0.82. Any of the ranges described above for thicknesses, sheet resistance, and visible transmission can be provided in the present tempered coated glass embodiments. Moreover, any of the film materials/compositions and layer stack arrangements described above can be provided in the present embodiments. Non-limiting methods for producing such tempered coated glass are described later.

Figure 4:
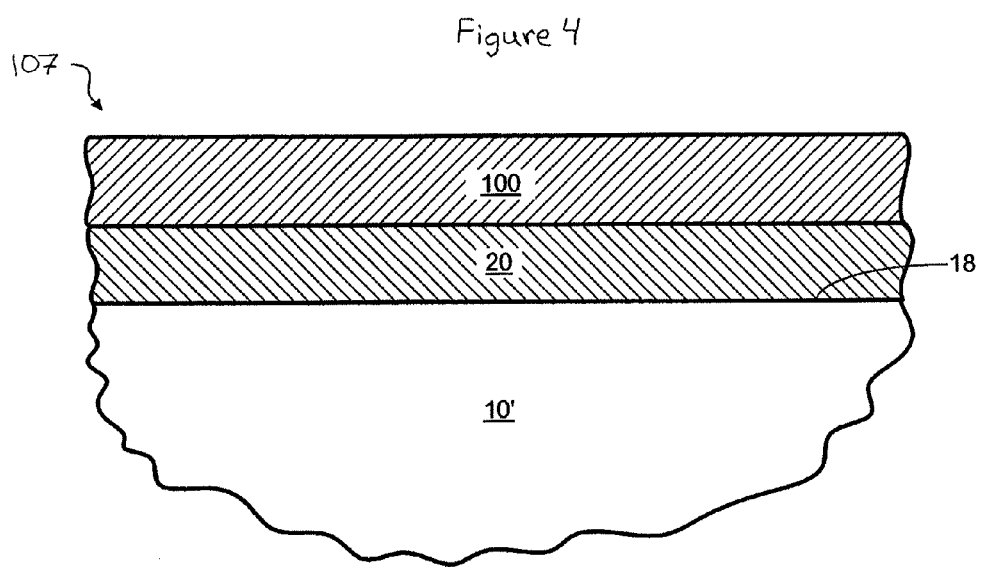
FIG. 4 is a broken-away schematic cross-sectional view of a glass pane bearing a transparent electrically conductive coating in accordance with certain embodiments of the invention.
Figure 5:
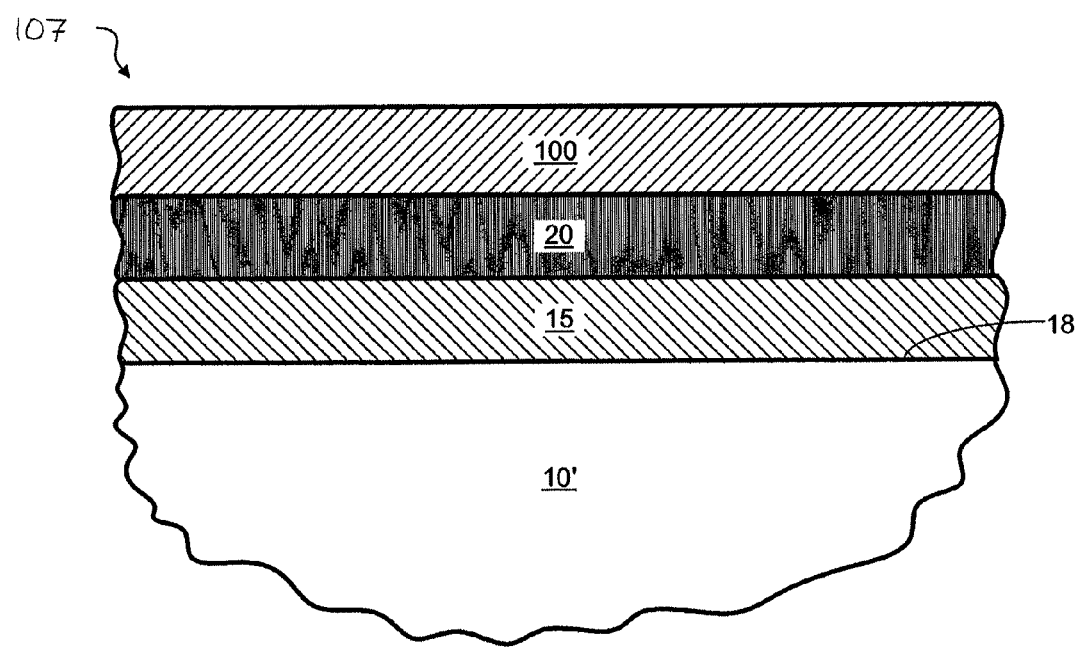
FIG. 5 is a broken-away schematic cross-sectional view of a glass pane bearing a transparent electrically conductive coating in accordance with other embodiments of the invention.

In connection with the transparent electrically conductive coating 107, FIGS. 4 and 5 depict two exemplary embodiments wherein the coating 107 includes a transparent conductive oxide film 20 and an optional overcoat film 100. In the embodiment of FIG. 4, the coating 107 includes, from surface 18 outwardly, the transparent conductive oxide film 20 and the optional overcoat film 100. If desired, a base film 15 can be added. For example, in the embodiment of FIG. 5, the coating 107 includes, from surface 18 outwardly, an optional base film 15, the transparent conductive oxide film 20, and the optional overcoat film 100. Films 15, 20, and 100 can be provided in the form of discrete layers, thicknesses of graded film, or a combination of both including at least one discrete layer and at least one thickness of graded film. While the base film 15 is shown as a single layer, it can alternatively be a plurality of layers.

When provided, the overcoat film 100 is located over the transparent conductive oxide film 20. In some cases, the overcoat film 100 comprises silicon nitride. Alternatively, the overcoat film 100 can comprise silicon oxynitride or silicon dioxide. In still other cases, the overcoat film 100 comprises tin oxide. In such cases, the tin oxide-containing overcoat film is devoid of indium oxide. In certain embodiments, the overcoat film 100 contains at least 75% tin, at least 85% tin, or at least 95% tin (on a metal-only basis), while also being devoid of indium oxide. For example, the overcoat film 100 may consist of (or at least consist essentially of) tin oxide (e.g., $SnO_2$).

The coating 107 can optionally include a nitride film between the transparent conductive oxide film 20 and the overcoat film 100. When provided, the nitride film may comprise one or more of silicon nitride, aluminum nitride, and titanium nitride. For example, a thin film of silicon nitride can optionally be positioned directly between (i.e., so as to contact both) the transparent conductive oxide film 20 and an overcoat film 100 comprising silicon oxynitride. When provided, this silicon nitride film may have a thickness of less than 250 Å, or even less than 200 Å, e.g., about 150 Å.

In other embodiments, the overcoat film 100 is in contact with the transparent conductive oxide film 20. Providing the overcoat film 100 directly over (i.e., so as to be in contact with) the underlying transparent conductive oxide film 20 can be advantageous. For example, providing fewer layers and interfaces may be desirable in connection with optical properties, stress, or both. Moreover, material, energy, and cost can be conserved by providing fewer layers.

When provided, the optional base film 15 has a thickness of 50 Å or more, such as about 70-300 Å. In certain embodiments, the coating 107 includes a base film comprising silicon dioxide (optionally together with some alumina), titanium dioxide, alumina, or tin oxide at a thickness of 75-150 Å. In one non-limiting example, the coating 107 consists of the following layers (in the following sequence moving outwardly from surface 18 of the glass pane 10'): silicon dioxide (100 Å)/ITO (1,350 Å)/$Si_xO_yN_z$ (940 Å).

The invention also provides embodiments wherein the transparent conductive oxide film 20 is directly on (i.e., in contact with) the substrate surface 18. In one non-limiting example, the coating 107 consists of the following layers (in the following sequence moving outwardly from surface 18 of the glass pane 10'): ITO (1,325 Å)/$Si_3N_4$ (440 Å).

The coating 107 can optionally further include an oxynitride film located on the overcoat film 100. When provided, this oxynitride film can have a thickness of between 100 Å and 1,300 Å, such as between 400 Å and 900 Å. The oxynitride film can optionally be directly over (i.e., so as to contact) the overcoat film 100. The oxynitride film may comprise aluminum, oxygen, and nitrogen. In some cases, the oxynitride film is an exposed outermost film of the coating 107. In one non-limiting example, the coating 107 consists of the following layers (in the following sequence moving outwardly from surface 18 of the glass pane 10'): silicon dioxide (100 Å)/ITO (1,400 Å)/$Si_xO_yN_z$ (940 Å).

Figure 6:
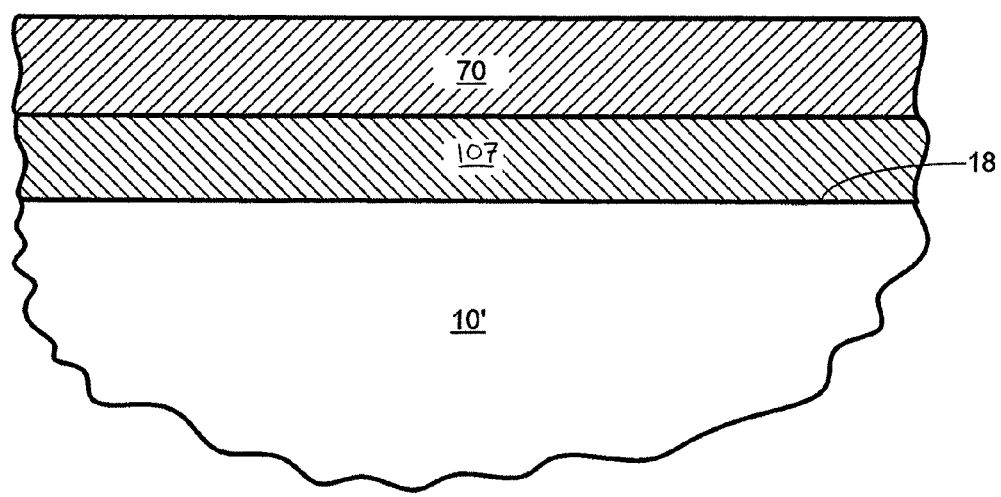
FIG. 6 is a broken-away schematic cross-sectional view of a glass pane bearing a transparent electrically conductive coating and a titanium-oxide containing film in accordance with still other embodiments of the invention.

Some embodiments of the invention provide a film comprising titanium oxide 70 over the transparent electrically conductive coating 107. Reference is made to FIG. 6. When provided, the film comprising titanium oxide 70 preferably is an exposed, outermost film. Thus, when both the optional oxynitride film and the optional film comprising titanium oxide 70 are provided, the film comprising titanium oxide preferably is located over the oxynitride film.

The film comprising titanium oxide 70 can optionally be provided over the TC coating 107 for any embodiment of the present disclosure. In preferred embodiments, the film comprising titanium oxide 70 has a thickness of less than 200 Å, such as from 10-75 Å, e.g., about 50 Å. In one non-limiting example, the coating 107 and the film comprising titanium oxide 70 consists of the following layers (in the following sequence moving outwardly from surface 18 of the glass pane 10'): silicon dioxide (100 Å)/ITO (1,350 Å)/$Si_3N_4$ (150 Å)/$Si_xO_yN_z$ (900 Å)/$TiO_2$ (50 Å).

When provided, the film comprising titanium oxide 70 preferably is photocatalytic, hydrophilic, or both. Suitable films of this nature are described in U.S. Pat. No. 7,294,404 and Ser. No. 11/129,820 and U.S. Pat. Nos. 7,713,632 and 7,604,865 and Ser. No. 11/293,032 and U.S. Pat. Nos. 7,862,910 and 7,820,309 and 7,820,296, the salient teachings of each of which are incorporated herein by reference.

If desired, a non-photocatalytic film having hydrophilic properties can be provided over the film comprising titanium oxide 70. For example, an outermost film comprising silicon dioxide (optionally together with some alumina) can optionally be provided. In still other embodiments, the film comprising titanium oxide 70 is omitted, and replaced with a hydrophilic coating. For example, the film comprising titanium oxide 70 in FIG. 6 can be replaced with a film comprising silicon dioxide.

Thus, certain embodiments of the invention provide a photocatalytic and/or hydrophilic coating over the transparent electrically conductive coating 107. Particularly desirable anti-condensation properties may be obtained by providing a coated glass pane 10' with both a lower conductivity perimeter region 210 and a photocatalytic and/or hydrophilic coating. The lower conductivity perimeter region 210 may remain warmer, thus decreasing the likelihood of condensation forming on that region of the coated surface 18, while the photocatalytic and/or hydrophilic coating may cause condensation to spread into a thin sheet and thus evaporate faster.

Preferably, all the films in the coating 107 are oxide, nitride, or oxynitride films. When the coating includes one or more films of silicon dioxide, silicon nitride, or silicon oxynitride, such film can optionally be sputter deposited from one or more silicon-aluminum targets, e.g., elemental targets comprising a sputterable material consisting of about 83% silicon and 17% aluminum. Thus, whenever a sputtered silicon dioxide, silicon nitride, or silicon oxynitride film is provided as part of the coating 107, the film can optionally include a small amount of aluminum. In some embodiments, all the film of the coating 107 is sputtered film.

The transparent electrically conductive coating 107 has a number of beneficial properties. The discussions herein report several of these properties. In some cases, properties are reported for a single (e.g., monolithic) pane 10' bearing the TC coating 107 on one surface 18. In other cases, these properties are reported for a double-pane IG unit 110 having the TC coating 107 on the #4 surface and a triple-silver low-emissivity coating on the #2 surface. The triple-silver low-emissivity coating is known commercially as the $LoE^3$-366 product from Cardinal CG Company. The reported properties are for a double-pane IG unit wherein both panes are clear 2.2 mm annealed soda-lime float glass with a ½ inch between-pane space filled with an insulative gas mix of 90% argon and 10% air ("the present IG unit"). Of course, these specifics are by no means limiting to the invention. For example, the low-emissivity coating can alternatively be on the #3 surface, the low-emissivity coating can alternatively be a single or double silver low-emissivity coating, or the low-emissivity coating can be omitted. Absent an express statement to the contrary, the discussions herein report determinations made using the well-known WINDOW 7.1 computer program (e.g., calculating center of glass data) under NFRC100-2010 conditions.

At the central region 205 of the coated surface 18, the transparent electrically conductive coating 107 can optionally have a sheet resistance of less than 30 Ω/square in combination with the coated glass pane 10' having a monolithic visible transmittance of greater than 0.82. Preferably, the sheet resistance of the TC coating 107 at the central region 205 of the coated surface 18 is less than 20 Ω/square in combination with the monolithic visible transmittance of the coated glass pane 10' being greater than 0.86. In certain embodiments, the TC coating 107 includes a transparent conductive oxide film 20 comprising indium tin oxide and having a thickness of between 1,050 Å and 1,450 Å, and the sheet resistance of the coating at the central region 205 is less than 15 Ω/square in combination with the monolithic visible transmittance of the coated glass pane 10' being between 0.86 and 0.92. Preferably, the sheet resistance and visible transmission are within one or more of the foregoing sets of property ranges over an entirety, or at least a substantial entirety, of the central region 205.

The transparent electrically conductive coating 107 can provide desirable reflected color properties. For example, at the central region 205, the present IG unit 110 can optionally exhibit an exterior reflected color characterized by an "a" color coordinate of between −7 and 2 (e.g., between −5 and 1, such as about −1.9) and a "b" color coordinate of between −9 and 0 (e.g., between −6 and −1, such as about −3.4). It will be appreciated that, in some cases, different color properties will be preferred for any of various reasons. The exterior reflected color measurement is taken from the perspective of looking at the #1 surface of the IG unit. For example, in the embodiment of FIG. 3, the exterior reflected color would be measured by directing radiation toward the side of the IG unit 110 that faces the outdoor environment (represented schematically by the sun 7).

The reflected color properties at the perimeter region 210 preferably are not very different from those at the central region 205. For example, the present pane 10' can optionally exhibit a film-side reflected color characterized by an "a" color coordinate that is no more than 4 points different (in some cases, no more than 2 points different) at the perimeter region 210 than at the central region 205. In addition, the present pane 10' can optionally exhibit a film-side reflected color characterized by a "b" color coordinate that is no more than 4 points different (in some cases, no more than 2 points different) at the perimeter region 210 than at the central region 205. This can optionally be the case when measuring the film-side reflected color monolithically, whether the pane 10' is from a multi-pane IG unit 110 or is intended to form a single-pane glazing. In other cases, minimizing the color difference may be of less concern, and the difference may be considerably greater.

The transmitted color properties at the perimeter region 210 preferably are not very different from those at the central region 205. For example, the present pane 10' can optionally exhibit a transmitted color characterized by an "a" color coordinate that is no more than 4 points different (in some cases, no more than 2 points different) at the perimeter region 210 than at the central region 205. In addition, the present pane 10' can optionally exhibit a transmitted color characterized by a "b" color coordinate that is no more than 4 points different (in some cases, no more than 2 points different) at the perimeter region 210 than at the central region 205. This may be the case when measuring the transmitted color monolithically, whether the pane 10' is from a multi-pane IG unit 110 or is intended to form a single-pane glazing. However, color difference will be of less concern in some cases; thus, the difference may be greater in those cases.

The present discussion of color properties is reported using the well-known color coordinates of "a" and "b." In more detail, the reported color coordinates result from conventional use of the well-known Hunter Lab Color System (Hunter methods/units, Ill. D65, 10 degree observer). The present color properties can be determined as specified in ASTM Method E 308, the relevant teachings of which are incorporated herein by reference.

In some embodiments, the coated glass pane 10' is part of a monolithic glazing. In other embodiments, the coated substrate is part of a multi-pane insulating glazing unit 110. Reference is made to FIG. 3, which depicts a double-pane IG unit. It is to be appreciated that the IG unit 110 can alternatively have three or more panes.

Insofar as the production method is concerned, a glass pane coated with a transparent electrically conductive coating 107 is provided. Coated glass of this nature can be purchased commercially from Cardinal CG Company of Spring Green, Wis., USA. Alternatively, such coated glass can be produced through a variety of well-known methods.

The production methods involve providing a glass pane 10' having opposed first 18 and second 16 surfaces. The coating 107 is deposited onto a surface 18 of the glass pane 10', e.g., as one or more discrete layers, as one or more thicknesses of graded film, or as a combination including at least one discrete layer and at least one thickness of graded film. In some cases, the deposition method involves sputtering, e.g., DC magnetron sputtering, which is a well-known deposition technique. Reference is made to Chapin's U.S. Pat. No. 4,166,018, the teachings of which are incorporated herein by reference. If desired, the coating 107 can be deposited by AC or pulsed DC sputtering from pairs of cathodes. HiPIMS and other modern sputtering methods can be used as well.

In the present production methods, a transparent conductive oxide film 20 is deposited onto (optionally over one or more base films on) the first surface 18 of the glass pane 10'. Preferably, the transparent conductive oxide film 20, as deposited, is a sub-oxide (i.e., its oxygen content is substoichiometric). In some cases, the deposition method involves sputtering. Two non-limiting sputter deposition examples are detailed below.

In one example, a pair of rotatable ceramic indium tin oxide targets is sputtered while an uncoated glass pane is conveyed past the activated targets at a rate of about 36 inches per minute. The relative weight amount of the two metals is: indium 90%, tin 10%. A power of 16 kW is used, and the sputtering atmosphere is 5 mTorr with a gas flow of 900 sccm argon and 10 sccm oxygen. The resulting substoichiometric indium tin oxide film has a thickness of about 1,100 Å. Directly over this film, a silicon nitride overcoat film is applied. The silicon nitride is applied at a thickness of about 560 Å by conveying the glass pane at about 36 inches per minute past a pair of rotary silicon aluminum targets (83% Si, 17% Al, by weight) sputtered at a power of 31.2 kW in a 5 mTorr atmosphere with a gas flow 920 sccm nitrogen.

In another example, a pair of rotatable metallic indium tin targets is sputtered while an uncoated glass pane is conveyed past the activated targets at a rate of about 60 inches per minute. The relative weight amount of the two metals is: indium 90%, tin 10%. A power of 16 kW is used for the pair of rotary targets. The sputtering atmosphere is 5 mTorr with a gas flow of 601 sccm argon and 100 sccm oxygen. The resulting substoichiometric indium tin oxide film has a thickness of about 1,240 Å. Directly over this film, a silicon nitride overcoat film is applied. The silicon nitride is applied at a thickness of about 600 Å by conveying the glass pane at about 60 inches per minute sequentially past a pair of rotary silicon aluminum targets (83% Si, 17% Al, by weight) sputtered at 38.6 kW in a 5 mTorr atmosphere with a gas flow 450 sccm argon and 451 sccm nitrogen.

The foregoing two examples are merely exemplary. Many other sputter deposition processes can be used to deposit the coating 107 onto the substrate 10'. Moreover, chemical vapor deposition, spray pyrolysis, sol-gel deposition, atomic layer deposition (ALD), or pulsed laser deposition can alternatively be used.

Insofar as the selective heat treatment is concerned, flash treatment is used in one group of embodiments. A variety of different flash treatment methods can be used.

In a first method example, the entire coating 107 is flash treated in a first step, and the perimeter region 210 is flash treated selectively (i.e., without simultaneously flash treating the central region 205) in a second step. Thus, the method can optionally involve performing a first flash treatment on an entire area of the coated surface 107 (the entire area including both the central region 205 and the perimeter region 210), and performing a second flash treatment that selectively flash treats the perimeter region, such that the perimeter region has a higher sheet resistance than the central region. The order of these two flash treatments is not limited. That is, the "second" flash treatment could be performed before the "first" flash treatment.

The second flash treatment can optionally be carried out using a mask that covers the central region 205, and leaves the perimeter region 210 exposed, during the second flash treatment. Alternatively, the second flash treatment can involve moving a flash lamp about the perimeter of the coated surface 18 and operating the flash lamp to selectively treat the perimeter region 210.

Another way to perform the second flash treatment is to use the same flash lamp array for both the first and second steps, and to convey the glass pane 10' past the flash lamp array in two separate passes, such that the first flash treatment is performed during the first pass and the second flash treatment is performed during the second pass. During the second pass, however, the lamps are selectively fired such that (during the second step) only the perimeter region 210 is flash treated. In such cases, as the glass pane 10' moves past (e.g., beneath) the row of lamps, all of the lamps are fired when a leading edge region (which defines one leg of the perimeter region 210) of the glass pane is positioned beneath the lamps. Then, as the glass pane 10' moves along past (e.g., beneath) the flash lamp array, only the edge lamps are fired (so as to only flash treat two side edge regions (which define two legs of the perimeter region 210). Finally, when a trailing edge region of the glass pane 10' reaches a position aligned with (e.g., beneath) the lamps, the whole row of lamps fires.

Thus, by performing two flash treatments on the perimeter region 210, it is possible to "over-convert" the TCO at the perimeter region 210, thus yielding TCO film having a higher sheet resistance than the TCO film at the central region 205.

The first flash treatment may be performed using a first flash bulb treatment device 600, and the second flash treatment may be performed using a second flash bulb treatment device 700. The first flash bulb treatment device 600 can, for example, be a flash bulb treatment device 600 arranged to flash treat an entire width of the coated surface 18. The second flash treatment can involve moving the second flash bulb treatment device 700 about a perimeter of the coated surface 18 while operating the second flash bulb treatment device so as to selectively heat treat the perimeter region 210 of the coated surface.

Figure 7:
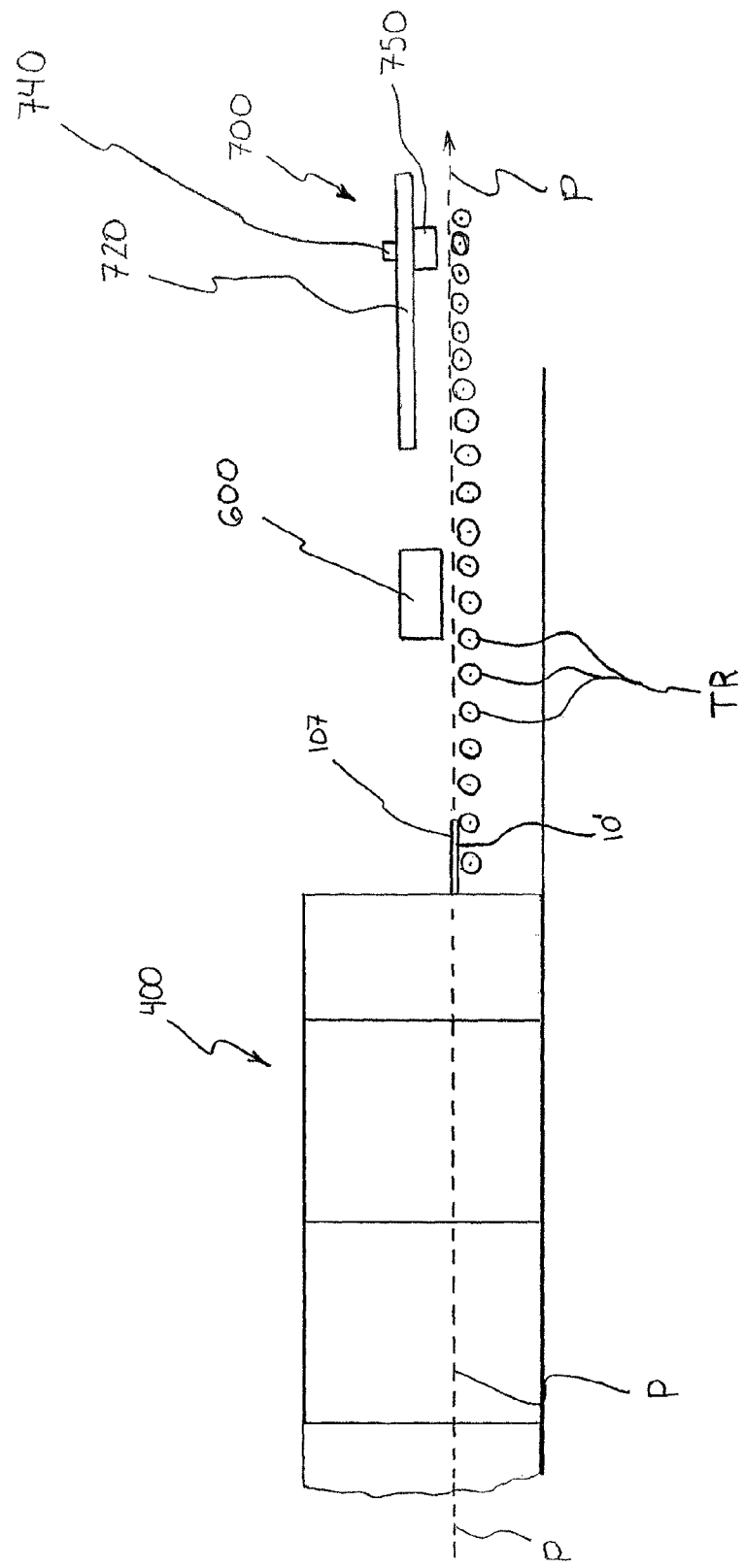
FIG. 7 is a broken-away schematic side view of a production line in accordance with certain embodiments of the present invention.

FIG. 7 depicts one non-limiting arrangement of first 600 and second 700 flash bulb treatment devices. Here, the two flash bulb treatment devices 600, 700 are located downstream of a coater 400 on a path of substrate travel P. The coater 400 can optionally be a sputter coater having a series of connected sputter deposition chambers through which the path of substrate travel P extends. As shown in FIG. 7, the path of substrate travel P can be defined, for example, by a series of spaced-apart transport rollers TR. It will be appreciated, however, that the path of substrate travel P can alternatively be defined by conveyor belts, tracks along which a pallet carrying the glass pane 10' is conveyed, etc.

In FIG. 7, the first flash bulb treatment device 600 can be configured (e.g., arranged) to remain stationary during the first flash treatment. Thus, as the coated glass pane 10' moves along the path of substrate travel P and passes beneath the first flash bulb treatment device 600, that device can be operated so as to flash treat the entire area of the coated surface 107. Various types of flash devices can be used. As just one example, the first flash bulb treatment device 600 can be of the nature detailed in U.S. patent application Ser. No. 14/934,706 (the teachings of this '706 application concerning the flash treatment device are hereby incorporated herein by reference). Equipment of this nature is commercially available from a variety of well-known commercial suppliers, including Ncc Nano LLC of Austin, Tex., U.S.A.

Figure 8:
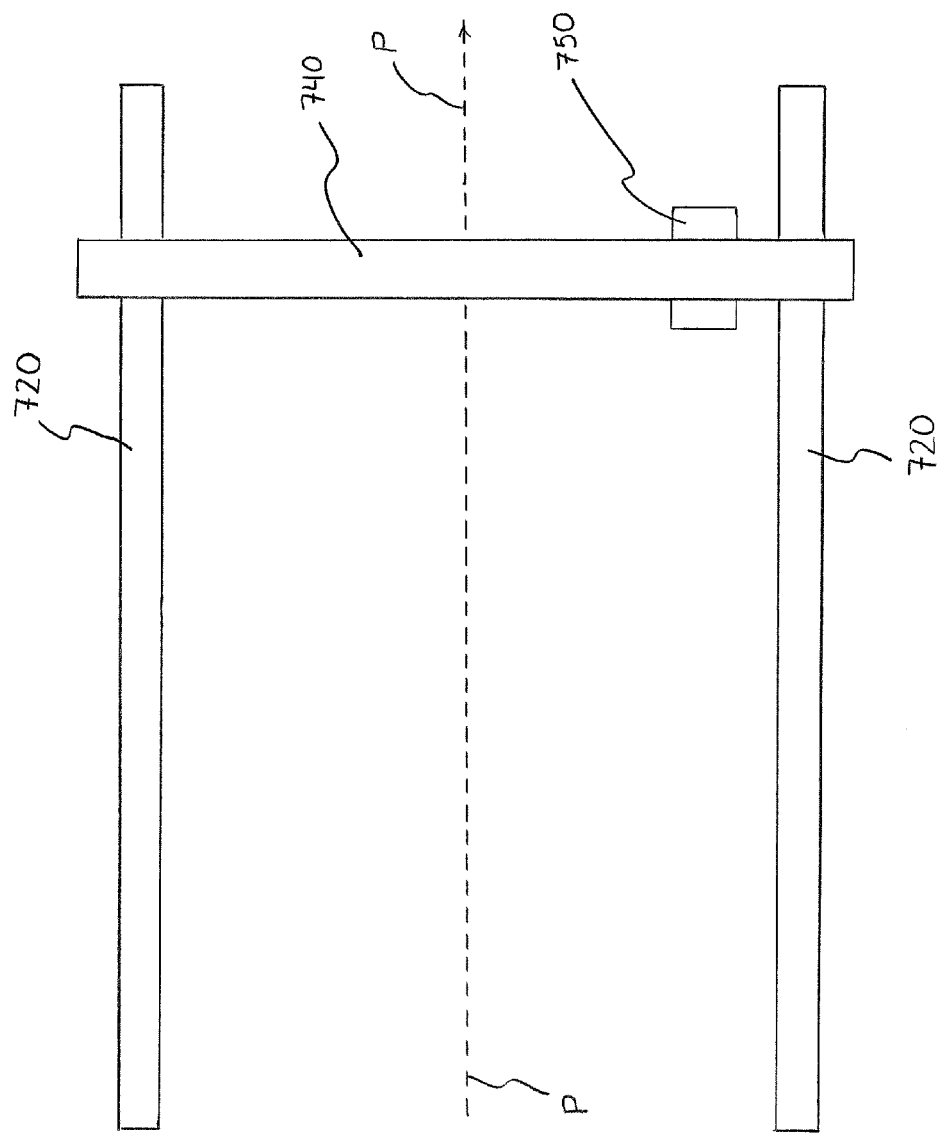
FIG. 8 is a schematic top view of one of the heat treatment devices of FIG. 7.

The second flash bulb treatment device 700 shown in FIG. 7 includes a flash treatment head 750 that is movable relative the coated glass pane 10'. This is best appreciated by referring to FIG. 8, which schematically depicts one non-limiting type of moveable flash bulb treatment device. Here, the flash treatment head 750 is on a gantry. In more detail, the flash treatment head 750 is mounted for movement along a first support beam 740. The first support beam 740 is arranged cross-wise to the path of the substrate travel P. The flash treatment head 750 is moveable along a track of the first support beam 740, such that the head can be moved in a direction perpendicular to the path of substrate travel P. To move the flash treatment head 750 parallel to the path of substrate travel P, the first support beam 740 can be moved (together with the flash treatment head) along two spaced-apart lateral support beams 720. This type of equipment is also commercially available from Ncc Nano LLC, or from other well-known commercial suppliers.

In operation, the coated glass pane 10' can optionally be moved into a stationary position beneath the second flash bulb treatment device 700. The flash treatment head 750, which is spaced above the coated surface 18, can then be moved so as to travel along the perimeter region 210 of the coated surface 18. In cases where the coated glass pane 10' has a square or rectangular shape, this may involve first moving the flash treatment head 750 along a first leg of the perimeter region, then changing direction so as to move the head along a second leg of the perimeter region, then changing direction so as to move the head along a third leg of the perimeter region, and finally changing direction so as to move the head along a fourth leg of the perimeter region. In embodiments of this nature, the flash treatment head 750 is constructed (e.g., arranged) such that its radiation is focused on the perimeter region 210 of the coated surface 18, but not on the central region 205.

An alternative way to carry out the foregoing first method example involves performing the first step, not with flash treatment, but instead using a tempering furnace or conventional oven. The first step can be performed, for example, by heat treating the coated glass pane 10' in a tempering furnace or conventional oven so as to convert the TCO and obtain the desired combination of high visible transmission and low sheet resistance. The tempering furnace or oven can be operated so as to either temper the glass or heat-strengthen it, as desired. In such cases, the second step can be performed in the manner described above, i.e., by selectively flash treating the perimeter region 210 of the coated surface 18. The cumulative effect of two such heat treatment steps on the perimeter region 210 is to "over convert" the TCO. In cases where the glass pane 10' is heat strengthened, the surface stress of the glass may be, for example, from 8,000-10,000 psi.

As a second method example, the TCO at the perimeter region 210 can be "under-converted." In such cases, the entire coating 107 can be flash treated in a first step, and the central region 205 can be flash treated selectively (i.e., without simultaneously flash treating the perimeter region 210) in a second step. Here again, the order of the two flash treatments is not limited. The "first" flash treatment could thus be performed after the "second" flash treatment.

In this method example, the first flash treatment under-converts the entire area of the coating 107, and the second flash treatment treats only the central region 205. As a result, the perimeter region 210 is left under-converted. This produces TCO film having a higher sheet resistance at the perimeter region 210 than at the central region 205.

Thus, the second method example can involve performing a first flash treatment on an entire area of the coated surface 18 (the entire area including both the central region 205 and the perimeter region 210), and performing a second flash treatment that selectively flash treats the central region, such that the perimeter region has a higher sheet resistance than the central region. If desired, both flash treatments can be performed using the same flash bulb treatment device, which can optionally be like the first flash bulb treatment device 600 of FIG. 7. Thus, the first flash treatment can be carried out (e.g., in the manner described above) so as to flash treat the entire area of the coated surface 18. In connection with the second flash treatment, one option is to provide a mask that covers the perimeter region 210 of the coated surface 18 during the second flash treatment. Another option is to perform the second flash treatment by using the same flash lamp array for both the first and second steps, but to selectively fire the lamps during the second step such that only the central region 205 is flash treated, whereas during the first step, the entire area of the coated surface 18 is flash treated.

In still other examples, the method may involve flash treating only the central region 205 of the coated surface without ever flash treating the perimeter region 210. In such cases, the TC coating 107 can be deposited (or otherwise provided) in a form having a lower level of electrical conductivity, which is desired for the perimeter region 210 of the coated surface 18. The central region 205 of the coated surface 18 can then be flash treated selectively to convert that region of the TC coating 107 so as to have a higher level of electrical conductivity than the perimeter region 210. Such selective flash treatment of the central region 205 can be carried out, for example, using a mask as described above.

Thus, in one group of embodiments, the TC coating 107 is a flash-treated coating. In certain embodiments of this nature, the TC coating 107 (or at least one region thereof) is subjected to an ultra-high-power ("UHP") flash-treatment that involves a peak pulse power of 15 kW/cm$^2$ or greater, e.g., in the range of 15-45 kW/cm$^2$, or even 20 kW/cm$^2$ or greater, e.g., in the range of 20-45 kW/cm$^2$. The terms "ultra-high-power flash treatment" and "UHP flash treatment" are defined for purposes of the present disclosure to mean flash treatment at a peak pulse power of 15 kW/cm$^2$ or greater. It will be appreciated that this is higher than the peak pulse powers commonly reported for conventional flash lamp treatment. Thus, the TC coating 107 may comprise a flash-treated transparent conductive oxide film having a morphology characterized by UHP flash-treatment at 15-45 kW/cm$^2$. Due to the rapid temperature change of the film, a distinctive average stress condition may result.

In another group of embodiments, the selective heat treatment involves performing a laser treatment on the coated surface 18. The laser treatment can involve, for example, treating the entire area of the coated surface 18 in a first step of the method, and selectively treating the perimeter region 210 in a second step of the method. The first treatment can convert a transparent conductive oxide film 20 of the coating 107 at the central region 205 to a desired (e.g., optimal) level of electrical conductivity, and the second treatment can "over-convert" the TCO film 20 at the perimeter region 210. The perimeter region 210 can thus be made less electrically conductive than the central region 205.

The first laser treatment step can, for example, involve moving the coated glass pane 10' beneath a stationary laser treatment device. As the glass pane 10' moves past this device, it can be operated so as to heat treat the entire area of the coating 107. If desired, the equipment used can be similar to that shown in FIG. 7, except that the first flash bulb treatment device 600 is replaced with a first laser treatment device and the second flash bulb treatment device 700 is replaced with a second laser treatment device. Equipment of this nature is commercially available from a variety of well-known commercial suppliers, including Manz AG of Reutlingen, Germany. Thus, the second laser treatment device can optionally be movable about the perimeter of the coated glass pane 10' in the same manner (e.g., using a gantry) as the flash treatment head 750 of FIG. 7. In such cases, the second laser treatment device can be moved and operated so as to focus its radiation selectively on the perimeter region 210 of the coated surface 18.

An alternative way to carry out the foregoing method example involves performing the first heat treatment step, not with a laser, but instead using a tempering furnace or conventional oven. The first step can be performed, for example, by heat treating the coated glass pane 10' in a tempering furnace or conventional oven so as to convert the TCO and obtain the desired combination of high visible transmission and low sheet resistance. The tempering furnace or oven can be operated so as to either temper the glass or heat-strengthen it, as desired. In such cases, the second step can be performed in the manner described above, i.e., by selectively laser treating the perimeter region 210 of the coated surface 18. The cumulative effect of two such heat treatment steps on the perimeter region 210 is to "over convert" the TCO. In cases where the glass pane 10' is heat strengthened, the surface stress of the glass may be, for example, from 8,000-10,000 psi.

Another possibility is to perform a first laser treatment on the entire area of the coated surface 18 in a first step of the method, and to selectively laser treat the central region 205 in a second step of the method. The two laser treatments performed on the central region 205 can convert that region of the TCO film 20 to a desired (e.g., optimal) combination of electrical conductivity and visible transmission, while the single laser treatment performed on the perimeter region 210 can leave that region of the coating "under converted," and thus less electrically conductive than the central region 205.

Still another possibility is to laser treat only the central region 205 of the coated surface 18 without ever laser treating the perimeter region 210. In such cases, the TC coating 107 can be deposited (or otherwise provided) so as to have a lower level of electrical conductivity, which is desired for the perimeter region 210 of the coated surface 18. The central region 205 of the coated surface 18 can then be laser treated selectively to convert that region of the TC coating 107 so as to have a higher level of electrical conductivity than the perimeter region 210. If desired, a laser head can be mounted on the crosswise support beam 740 of a gantry like that shown in FIG. 8, and the laser head moved over the central region 205 of the coated surface 18 while the laser emission is focused so as to selectively treat only the central region of the coated surface. Another possibility is to provide a mask over the perimeter region 210 of the coated surface 18, while operating the laser head, such that only the central region 205 is laser treated.

Yet another possibility is to laser treat the entire coated surface 18, and to selectively flash treat either the central region 205 or the perimeter region 210 of the coated surface, such that the transparent electrically conductive coating 107 has a higher electrical conductivity at the central region than it does at the perimeter region.

A further possibility is to flash treat the entire coated surface 18, and to selectively laser treat either the central region 205 or the perimeter region 210 of the coated surface, such that the transparent electrically conductive coating 107 has a higher electrical conductivity at the central region than it does at the perimeter region.

In embodiments involving a laser treatment step, the laser radiation can optionally have a wavelength between 500 and 2,000 nm, such as between 520 nm and 1,300 nm. Laser radiation of this nature may be well absorbed by the TC coating 107 while being only very weakly absorbed by the glass pane 10'. Laser diodes emitting at a wavelength of about 808 nm, 880 nm, 940 nm, or 980 nm can optionally be used.

In certain embodiments, the laser treatment step uses excimer lasers, which have shorter wavelengths. In such cases, the laser radiation may have a wavelength between 100 and 400 nm, and typically between 125 nm and 355 nm, such as 126 nm (Ar2), 146 nm (Kr2), 157 (F2), 172 nm or 175 nm (Xe2), 193 nm (ArF), 222 nm (KrCl), 248 nm (KrF), 282 nm (XeBr), 308 nm (XeCl), or 351 nm (XeF). While glass is more absorbent of these shorter wavelengths, the coating 107 will tend to absorb such wavelengths so strongly that little radiation reaches the glass.

Thus, various embodiments of the invention provide a heat treatment method that includes two heat treatment steps. In some cases, the first heat treatment step involves tempering the coated glass pane 10'. In such cases, the tempering typically involves heating the glass pane 10' to a temperature of at least 680° C. For example, the glass may be placed in a furnace maintained at about 680-705° C. (preferably controlled to 690-700° C.). The glass is typically held in the furnace for 100-120 seconds with constant movement to improve temperature uniformity. This is intended to raise the glass temperature to about 640° C. The glass is then removed from the furnace and subjected to a stream of air for about 50 seconds such that the glass is cool enough for an operator to handle.

In cases where tempering is used for the first heat treatment step, the second heat treatment step involves selectively heat treating either the central region 205 or the perimeter region 210 of the coated surface 18, such that the transparent electrically conductive coating 107 has a higher electrical conductivity at the central region than it does at the perimeter region. The second heat treatment can involve, for example, selectively flash treating or selectively laser treating either the central region 205 or the perimeter region 210 of the coated surface 18. Flame treatment may alternatively be used. Another alternative is to replace the flash bulb or laser treatment system with another type of device that focuses infrared radiation onto the coated surface 18. This may involve using mirrors or lenses to obtain the desired power per unit area.

Preferably, the selective heat treatment technique is one that allows the rear surface 16 of the glass pane 10' to remain at a temperature of 150 degrees C. or less during the selective heat treatment. In some embodiments, the tempering involves heating the glass pane 10' to a temperature of at least 680° C., and the second heat treatment involves selectively flash or laser treating the perimeter region 210 of the coated surface 18, such that the rear surface 16 of the glass pane 10' is maintained at a temperature of 150 degrees C. or less during the second heat treatment.

Thus, in certain embodiments, the first heat treatment involves tempering the coated glass pane 10' such that, following the tempering, the glass pane is tempered glass having a surface stress of greater than 10,000 psi. In such cases, following the second heat treatment, the glass pane 10' preferably remains tempered glass having the surface stress of greater than 10,000 psi, such as greater than 10,000 psi and less than 15,000 psi, or perhaps optimally 12,000 psi to 15,000 psi.

Thus, the invention provides a glass pane 10' having a transparent electrically conductive coating 107 on a surface 18 of the glass pane, such that the glass pane has a coated surface. The coated surface 18 has a central region 205 and a perimeter region 210. The transparent electrically conductive coating 107 has a higher electrical conductivity at the central region 205 than it does at the perimeter region 210. The sheet resistance of the coating 107 is higher at the perimeter region 210 than it is at the central region 205. Yet the coating 107 has a visible transmission that is substantially the same at the perimeter region 210 as it is at the central region 205. The thickness of the coating 107 is also preferably the same, or at least substantially the same, at the perimeter region 210 as it is at the central region 205.

FIG. 2 depicts an embodiment wherein the glass pane 10' is mounted to a frame 300. Thus, the illustrated glazing 500 includes both the coated glass pane 10' and the frame 300. The perimeter region 210 of the coated surface 18 is adjacent to the frame 300, while the central region 205 of the coated surface is spaced inwardly from the frame. The frame 300 can be any conventional window, door, or skylight frame. In the embodiment of FIG. 2, the pane 10' can optionally be part of a multiple-pane insulating glazing unit. Alternatively, the pane 10' in FIG. 2 can be monolithic.

FIG. 3 depicts an embodiment wherein a glazing includes a frame 300 and a multiple-pane insulating glass unit 110. The IG unit 110 is mounted to the frame 300. The IG unit 110 includes an inboard glass pane 10' and an outboard glass pane 10. The IG unit 110 has at least one between-pane space 800. The outboard glass pane 10 defines an external surface 12 that is exposed to an outdoor environment (as represented by the sun 7). Thus, the external surface 12 of the outboard glass pane 10 is in periodic contact with rain. The inboard glass pane 10' defines an external surface 18 that is exposed to a room-side environment inside a building. In the embodiment of FIG. 3, the external surface 18 of the inboard glass pane 10' has a transparent electrically conductive coating 107, so as to define a coated surface. This coated surface 18 has a central region 205 and a perimeter region 210. The transparent electrically conductive coating 107 has a higher electrical conductivity at the central region 205 than it does at the perimeter region 210. Yet the coating 107 has a visible transmission that is substantially the same at the perimeter region 210 as it is at the central region 205. The thickness of the coating 107 is also preferably the same, or at least substantially the same, at the perimeter region 210 as it is at the central region 205.

In embodiments involving an insulating glass unit, one or more internal surfaces (e.g., 14, 16) can optionally have a low-emissivity coating. For example, the #2 surface 14 of the IG unit 110 of FIG. 3 can optionally have a low-emissivity coating. Additional or alternatively, a low-emissivity coating can optionally be provided on the #3 surface. When provided on any internal surface of an IG unit, the low-emissivity coating preferably includes at least one silver-inclusive film, which may contain more than 50% silver by weight (e.g., a metallic silver film). In some embodiments, the low-emissivity coating includes three or more infrared-reflective films (e.g., silver-containing films). Low-emissivity coatings with three or more infrared-reflective films are described in U.S. patent application Ser. No. 11/546,152 and U.S. Pat. Nos. 7,572,511 and 7,572,510 and 7,572,509 and Ser. No. 11/545,211 and U.S. Pat. Nos. 7,342,716 and 7,339,728, the salient teachings of each of which are incorporated herein by reference. In other cases, the low-emissivity coating can be a "single silver" or "double silver" low-emissivity coating, which are well known to skilled artisans.

While some preferred embodiments of the invention have been described, it should be understood that various changes, adaptations and modifications may be made therein without departing from the spirit of the invention and the scope of the appended claims.

What is claimed is:

1. A heat treatment method, the method comprising providing a glass pane having a transparent electrically conductive coating on a surface of the glass pane such that the glass pane has a coated surface, the coated surface having a central region and a perimeter region, and the method includes selectively heat treating either the central region or the perimeter region of the coated surface such that the transparent electrically conductive coating has a higher electrical conductivity at the central region than it does at the perimeter region.

2. The method of claim 1 wherein said selective heat treatment is carried out such that the transparent electrically conductive coating has a visible transmission that is substantially the same at the perimeter region as it is at the central region.

3. The method of claim 1 wherein said selective heat treatment involves moving a heat treatment device about a perimeter of the coated surface while operating the heat treatment device so as to selectively heat treat the perimeter region of the coated surface.

4. The method of claim 1 wherein the method comprises performing a first flash treatment on an entire area of the coated surface, said entire area including both the central region and the perimeter region, the method further comprising performing a second flash treatment that selectively flash treats the perimeter region such that the perimeter region has a higher sheet resistance than the central region.

5. The method of claim 4 wherein the first flash treatment is performed using a first flash bulb treatment device, the second flash treatment is performed using a second flash bulb treatment device, and the second flash treatment involves moving the second flash bulb treatment device about a perimeter of the coated surface while operating the second flash bulb treatment device so as to selectively heat treat the perimeter region of the coated surface.

6. The method of claim 1 wherein the method comprises performing a first flash treatment on an entire area of the coated surface, said entire area including both the central region and the perimeter region, the method further comprising performing a second flash treatment that selectively flash treats the central region such that the perimeter region has a higher sheet resistance than the central region.

7. The method of claim 1 wherein the glass pane has a rear surface that is maintained at a temperature of 150 degrees C. or less during said selective heat treatment.

8. The method of claim 7 wherein the glass pane is annealed glass, said annealed glass having a surface stress of less than 3,500 psi prior to and after said selective heat treatment.

9. The method of claim 1 wherein the transparent electrically conductive coating comprises a transparent electrically conductive oxide film, and said selective heat treatment causes the transparent electrically conductive oxide film to be oxidized to a different extent at the central region than at the perimeter region.

10. The method of claim 1 wherein the transparent electrically conductive coating comprises an indium tin oxide film, and said selective heat treatment causes the indium tin oxide film to be oxidized to a different extent at the central region than at the perimeter region.

11. The method of claim 1 wherein said selective heat treatment is performed such that the transparent electrically conductive coating has a sheet resistance that is at least 5 Ω/square higher at the perimeter region than it is at the central region.

12. The method of claim 1 wherein said selective heat treatment is performed such that the visible transmission at the perimeter region is no more than 2% different from the visible transmission at the central region.

13. The method of claim 1 wherein the transparent electrically conductive coating has a thickness of less than 3,000 Å, the thickness of the transparent electrically conductive coating being substantially the same at the perimeter region as it is at the central region.

14. The method of claim 1 wherein after said selective heat treatment, at the central region, the transparent electrically conductive coating has a sheet resistance of less than 30 Ω/square in combination with the coated glass pane having a monolithic visible transmittance of greater than 0.82.

15. The method of claim 1 wherein the perimeter region has a width that is greater than ⅛ inch but less than 8 inches.

16. A heat treatment method, the method comprising providing a glass pane having a transparent electrically conductive coating on a surface of the glass pane such that the glass pane has a coated surface, the coated surface having a central region and a perimeter region, the method involves performing first and second heat treatments, the first heat treatment comprises tempering said coated glass pane, the second heat treatment comprises selectively heat treating either the central region or the perimeter region of the coated surface such that the transparent electrically conductive coating has a higher electrical conductivity at the central region than it does at the perimeter region.

17. The method of claim 16 wherein the first heat treatment comprises tempering said coated glass pane such that, following said tempering, the glass pane is tempered glass having a surface stress of greater than 10,000 psi, and wherein following said second heat treatment the glass pane remains tempered glass having the surface stress of greater than 10,000 psi.

18. The method of claim 16 wherein said tempering involves heating the glass pane to a temperature of at least 680° C., and said second heat treatment comprises selectively flash or laser treating the perimeter region of the coated surface, the glass pane having a rear surface that is maintained at a temperature of 150 degrees C. or less during said second heat treatment.

19. The method of claim 16 wherein the transparent electrically conductive coating comprises an indium tin oxide film, and said selective heat treatment causes the indium tin oxide film to be oxidized to a different extent at the central region than at the perimeter region.

20. The method of claim 16 wherein said selective heat treatment is performed such that the transparent electrically conductive coating has a sheet resistance that is at least 5 Ω/square higher at the perimeter region than it is at the central region.

21. The method of claim 16 wherein said selective heat treatment is performed such that the transparent electrically conductive coating has a visible transmission at the perimeter region that is no more than 2% different from the visible transmission at the central region.

22. The method of claim 16 wherein the transparent electrically conductive coating has a thickness of less than 3,000 Å, and wherein after said selective heat treatment, at the central region, the transparent electrically conductive coating has a sheet resistance of less than 30 Ω/square in combination with the coated glass pane having a monolithic visible transmittance of greater than 0.82.

* * * * *